(12) United States Patent
Matsumoto

(10) Patent No.: US 8,746,431 B2
(45) Date of Patent: Jun. 10, 2014

(54) POWER TRANSMISSION DEVICE

(75) Inventor: Akio Matsumoto, Anjo (JP)

(73) Assignee: Jtekt Corporation, Osaka-shi (JP)

( * ) Notice: Subject to any disclaimer, the term of this patent is extended or adjusted under 35 U.S.C. 154(b) by 1081 days.

(21) Appl. No.: 11/859,911

(22) Filed: Sep. 24, 2007

(65) Prior Publication Data

US 2008/0073170 A1    Mar. 27, 2008

(30) Foreign Application Priority Data

Sep. 26, 2006    (JP) .................. 2006-261105

(51) Int. Cl.
*F16D 21/08*    (2006.01)
*F16D 27/115*    (2006.01)

(52) U.S. Cl.
USPC ........... 192/112; 192/35; 403/359.6; 464/182

(58) Field of Classification Search
USPC .................. 192/84.7, 112, 70.2, 35; 464/182; 403/359.1, 359.6
See application file for complete search history.

(56) References Cited

U.S. PATENT DOCUMENTS

| | | | | |
|---|---|---|---|---|
| 1,803,995 | A | * | 5/1931 | Chilton ...................... 403/359.6 |
| 2,228,770 | A | * | 1/1941 | Le Tourneau ................. 403/334 |
| 3,002,593 | A | * | 10/1961 | Black et al. .................. 192/3.29 |
| 3,893,551 | A | * | 7/1975 | Ahlen .......................... 192/3.33 |
| 4,427,102 | A | | 1/1984 | Schilling |
| 5,012,908 | A | * | 5/1991 | Kobayashi et al. ............. 192/35 |
| 6,623,202 | B2 | * | 9/2003 | Hansson et al. ........... 403/359.6 |
| 6,729,455 | B2 | * | 5/2004 | Hirota et al. .................... 192/35 |
| 2003/0066727 | A1 | * | 4/2003 | Suzuki ............................ 192/35 |
| 2006/0000682 | A1 | * | 1/2006 | Yamamoto et al. .......... 192/3.29 |

FOREIGN PATENT DOCUMENTS

| | | |
|---|---|---|
| EP | 0 856 676 A1 | 8/1998 |
| GB | 2 292 200 A | 2/1996 |
| JP | 58-8832 A | 1/1983 |
| JP | 2000-179584 | 6/2000 |
| JP | 3256737 | 12/2001 |
| JP | 2002-103997 | 4/2002 |
| JP | 2002-168271 | 6/2002 |

(Continued)

OTHER PUBLICATIONS

Office Action issued Oct. 12, 2010, in Japan Patent Application No. 2006-261105.

(Continued)

*Primary Examiner* — David D Le
*Assistant Examiner* — Terry Chau
(74) *Attorney, Agent, or Firm* — Oblon, Spivak, McClelland, Maier & Neustadt, L.L.P.

(57) ABSTRACT

A flanged coupling member is provided with a shaft portion to which a drive force is input, and a flange portion formed in one end of the shaft portion. The flanged coupling member is coupled to a front housing member with a bolt in which a shaft portion thereof is coaxially arranged in a front housing member and a flange portion contacts an outer surface in an axial direction of a bottom portion of the front housing member. The flange portion is provided with a tubular engagement portion that extends in an axial direction from an outer peripheral edge thereof. The engagement portion is arranged on an outer circumference of the front housing member on the basis of the fastening, and the engagement portion and the front housing member are engaged via a spline. The flanged coupling member is fastened to the front housing member at the shaft portion.

10 Claims, 2 Drawing Sheets

(56) References Cited

FOREIGN PATENT DOCUMENTS

| | | |
|---|---|---|
| JP | 2002-235774 | 8/2002 |
| JP | 2002-340043 | 11/2002 |
| JP | 2004-332758 | 11/2004 |
| JP | 2006-77829 | 3/2006 |

OTHER PUBLICATIONS

Office Action issued Jul. 17, 2012 in Japanese Patent Application No. 2011-164410.

Office Action issued May 10, 2011, in Japanese Application No. 2006-261105, filed Sep. 26, 2006.

* cited by examiner

POWER TRANSMISSION DEVICE

BACKGROUND OF THE INVENTION

The present invention relates to a power transmission device.

Conventionally, there has been known a power transmission device provided with a tubular first rotator having a bottomed tubular shape, a shaft-shaped second rotator arranged rotatably within the first rotator, and a clutch mechanism arranged between the first rotator and the second rotator. The first rotator is rotated by a drive force of a vehicle. The second rotator is arranged coaxially with the first rotator. The clutch mechanism couples the first rotator and the second rotator so as to transmit torque. As one kind of the power transmission device mentioned above, Japanese Laid-Open Patent Publication No. 2004-332758 discloses a power transmission device in which an input shaft portion projects from an outer surface of a bottom portion of the first rotator. Further, Japanese Patent No. 3256737 discloses a power transmission device in which a flange portion is provided in a propeller shaft, and a bottom portion of a first rotator is fastened to the flange portion by bolts.

The power transmission device described in Japanese Laid-Open Patent Publication No. 2004-332758 has a problem that it is impossible to employ a simple machining method, for example, the flow forming, and the machining cost of the first rotator is high. Further, in a power transmission device provided with an electromagnetic coil and controlling an engaging force of a clutch on the basis of an applied current to the electromagnetic coil, there is a case that the first rotator is formed of an aluminum alloy, as described in Japanese Patent No. 3256737. However, in the power transmission device mentioned above, it is impossible to transmit a sufficient drive force via an input shaft portion having a comparatively small diameter in the light of the strength, and there is a case where it is impossible to employ a structure in which the input shaft portion projects from the outer surface of the bottom portion of the first rotator.

Further, in the power transmission device in which the bottom portion of the first rotator is fastened to the flange portion by the bolts as described in Japanese Patent No. 3256737, since the bolts are screwed to the bottom portion of the first rotator from the flange portion, a space (or the thickness of the bottom portion) for forming bolt holes is necessary in the bottom portion of the first rotator. Further, since a plurality of through holes are formed in the flange portion, it is necessary to form the flange portion thick so as to avoid accompanying reduction of strength. This structure is disadvantageous in the light of weight savings and downsizing, particularly in reduction of axial length, and there is a room for improvement with respect to these points.

SUMMARY OF THE INVENTION

An objective of the present invention is to provide a power transmission device that reduces costs, weight, and axial dimension without reducing torque transmission efficiency.

To achieve the foregoing objective and in accordance with one aspect of the present invention, a power transmission device is provided, which includes: a tubular first rotator having a bottom portion, an outer surface, and an axial direction, the first rotator having a recess or a projection on an outer surface of the first rotator; a shaft-shaped second rotator arranged rotatably within the first rotator, the second rotator being arranged coaxially with the first rotator; a clutch mechanism arranged between the first rotator and the second rotator and coupling the first rotator and the second rotator so as to transmit torque; a flanged coupling member coupled to the first rotator so as to be prevented from rotating relative to the first rotor; and a bolt. The flanged coupling member includes a flange portion brought into contact with the outer surface of the bottom portion of the first rotor in the axial direction, a shaft portion projecting from the flange portion, and an engagement portion extending in an opposite direction of the shaft portion in the flange portion and engaged with the first rotator. The engagement portion has an engagement projection or an engagement recess. The first rotator is fastened to the flanged coupling member with the bolt inserted into the first rotator coaxially with the shaft portion. The engagement projection or the engagement recess of the engagement portion is engaged with the recess or the projection of the first rotator, whereby the flanged coupling member is coupled to the first rotator so as to be prevented from rotating relative to the first rotor.

DETAILED DESCRIPTION OF THE PREFERRED EMBODIMENTS

Figure 1:
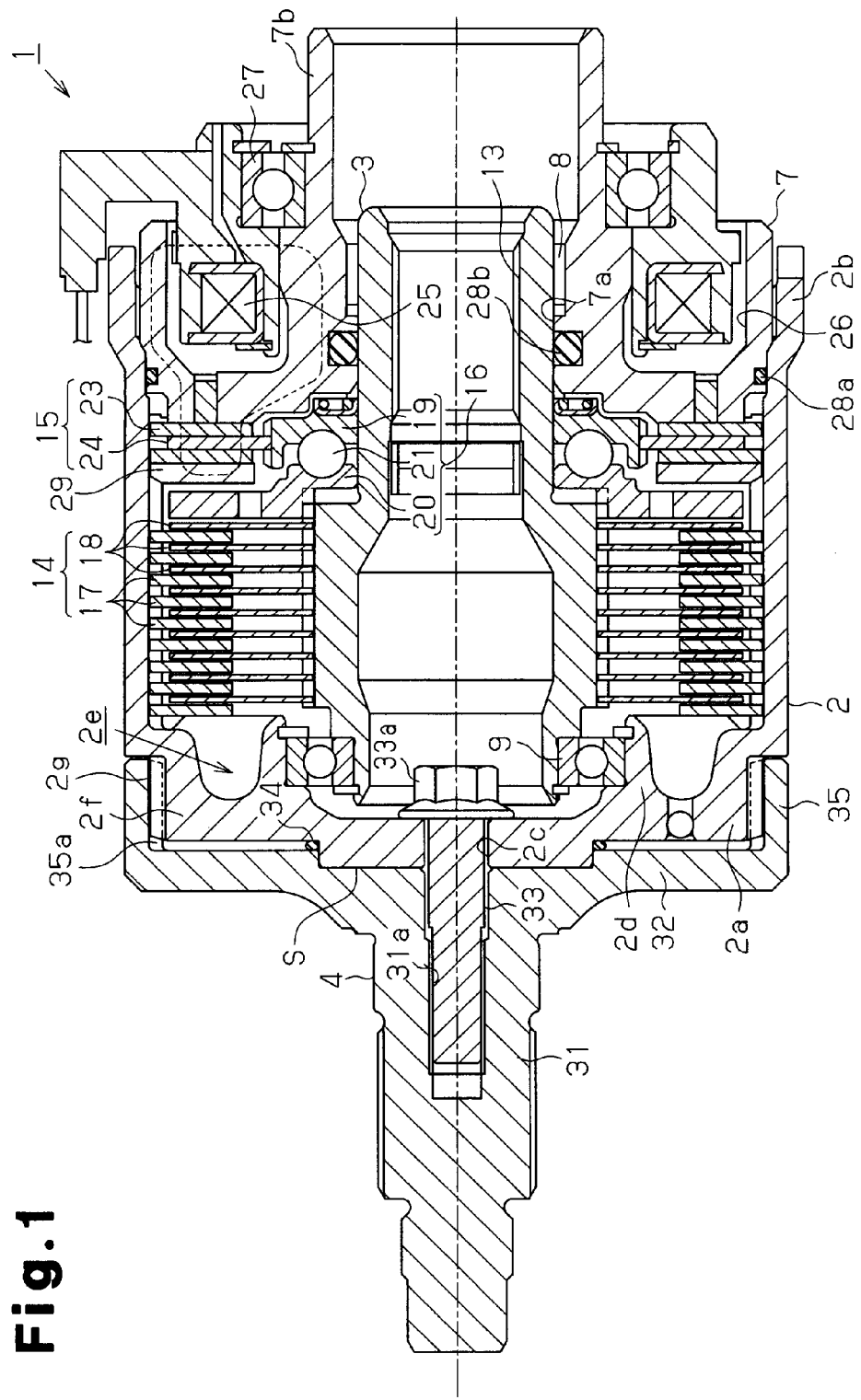
FIG. 1 is a cross-sectional view schematically showing the structure of a power transmission device.

A power transmission device according to one embodiment of the present invention will now be described with reference to the drawings. As shown in FIG. 1, a power transmission device 1 in accordance with the present embodiment is provided with a front housing member 2 corresponding to a first rotator, and a hollow and shaft shaped inner shaft 3 corresponding to a second rotator. The front housing member 2 is formed in a tubular shape having a bottom. The inner shaft 3 is arranged rotatably within the front housing member 2. The inner shaft 3 is arranged coaxially with the front housing member 2.

A flanged coupling member 4 independently formed from the front housing member 2 is coupled to a bottom portion 2a of the front housing member 2. The front housing member 2 is coupled to a propeller shaft (not shown) via the flanged coupling member 4, and is rotated on the basis of a drive force generated in an engine (not shown) corresponding to a driving source. The front housing member 2 is made of a non-magnetic material, for example, an aluminum alloy, and the flanged coupling member 4 is made of an iron-based metal.

An annular rear housing member 7 is fitted and attached to an open end 2b of the front housing member 2. The inner shaft 3 is rotatably supported by a slide bearing 8 provided in a center hole 7a and a ball bearing 9 provided within the front housing member 2, in a state in which an end portion is inserted to a center hole 7a of the rear housing member 7. In the inner shaft 3, a coupling portion (a spline engagement portion) 13 to a rear differential (not shown) is formed in an inner circumference of an end portion (the right end portion in FIG. 1) opposing the rear housing member 7.

Within the front housing member 2, there are provided a main clutch 14 which can couple the front housing member 2 and the inner shaft 3 so as to transmit the torque, a pilot clutch 15 positioned between the main clutch 14 and the rear housing member 7 along an axial direction of the main clutch 14, and a cam mechanism 16 positioned between the main clutch 14 and the pilot clutch 15.

In the main clutch 14 in accordance with the present embodiment, a multi-plate friction clutch is employed in which a plurality of outer clutch plates 17 and inner clutch plates 18, which are movable along an axial direction, are alternately arranged. Specifically, each of the outer clutch plates 17 is engaged with to an inner circumference of the front housing member 2 via a spline, and each of the inner clutch plates 18 is engaged with an outer circumference of the inner shaft 3 via a spline, whereby the outer clutch plate 17 and the inner clutch plate 18 are structured such as to be movable in an axial direction and be integrally rotatable with the corresponding one of the front housing member 2 and the inner shaft 3.

The main clutch 14 in accordance with the present embodiment is constructed such that the outer clutch plates 17 and the inner clutch plates 18 are pressed in the axial direction and frictionally engaged with each other, thereby connecting the front housing member 2 and the inner shaft 3, that is, coupling the front housing member 2 and the inner shaft 3 to each other so as to transmit the torque.

The cam mechanism 16 is provided with a first cam 19, a second cam 20, and ball members 21. The first cam 19 is rotatably supported to the inner shaft 3. The second cam 20 is engaged with an outer circumference of the inner shaft 3 via a spline, so as to be integrally rotated with the inner shaft 3 and be movable in the axial direction. The ball members 21 are interposed between the first cam 19 and the second cam 20.

In the present embodiment, both of the first cam 19 and the second cam 20 are formed in a disc shape. The first cam 19 is arranged in such a manner as to oppose to the rear housing member 7, and the second cam 20 is arranged so as to oppose to the main clutch 14. An outer circumferential surface of the first cam 19 is engaged with an inner circumferential end of the inner clutch plate 24 via a spline, and the second cam 20 is engaged with an outer circumference of the inner shaft 3 via a spline. A plurality of U-shaped grooves are formed in opposing surfaces of the first cam 19 and the second cam 20 in such a manner as to oppose to each other. The ball members 21 are held by the first cam 19 and the second cam 20 in a state of being arranged within each of the opposing U-shaped grooves. A cam mechanism 16 in accordance with the present embodiment is constructed such that the first cam 19 and the second cam 20 are relatively rotated, whereby the first cam 19 and the second cam 20 are spaced, that is, the second cam 20 serving as the cam member is moved toward the main clutch 14.

In the pilot clutch 15 corresponding to the second clutch, a multi-plate friction clutch is employed in which a plurality of outer clutch plates 23 and inner clutch plates 24 that are movable in an axial direction are alternately arranged, in the same manner as the main clutch 14 mentioned above. Specifically, each of the outer clutch plates 23 is engaged with an inner circumference of the front housing member 2 via a spline, and each of the inner clutch plates 24 is engaged with an outer circumference of the first cam 19 via a spline. Accordingly, the outer clutch plate 23 and the inner clutch plate 24 are constructed such as to be movable in the axial direction and be integrally rotatable with the corresponding one of the front housing member 2 and the first cam 19. A pilot clutch 15 in accordance with the present embodiment is constructed such that the outer clutch plate 23 and the inner clutch plate 24 are pressed in the axial direction and frictionally engaged with each other, thereby coupling the front housing member 2 and the first cam 19 so as to transmit the torque.

In other words, the first cam 19 holds the ball members 21 with respect to the second cam 20 and integrally rotates with the second cam 20, that is, the inner shaft 3, at a time when the pilot clutch 15 is not operating. At this time, a rotational difference corresponding to a rotational difference between the front housing member 2 and the inner shaft 3 is generated between the front housing member 2 and the first cam 19. Further, the pilot clutch 15 transmits the torque on the basis of the rotational difference between the front housing member 2 and the inner shaft 3 (the first cam 19) to the cam mechanism 16 by coupling the front housing member 2 and the first cam 19 so as to transmit the torque, on the basis of its operation.

In other words, in the power transmission device 1 in accordance with the present embodiment, the torque based on the rotational difference between the front housing member 2 and the inner shaft 3 is transmitted to the cam mechanism 16 on the basis of the operation of the pilot clutch 15. The cam mechanism 16 moves the second cam 20 toward the main clutch 14 along the axial direction on the basis of the rotational difference between the first cam 19 and the second cam 20 generated by the transmitted torque. In other words, the cam mechanism 16 converts the torque based on the rotational difference between the front housing member 2 and the inner shaft 3 transmitted via the pilot clutch 15 into a pressing force in the axial direction. Further, the second cam 20 presses the main clutch 14, whereby the main clutch 14 is operated. In other words, the front housing member 2 and the inner shaft 3 are coupled so as to transmit the torque.

A pilot clutch 15 in accordance with the present embodiment forms an electromagnetic clutch in which an electromagnet 25 serves as a drive source. Specifically, an annular groove 26 open in the opposite direction (the right side in FIG. 1) of the front housing member 2 is formed in the rear housing member 7. The electromagnet 25 is accommodated within the annular groove 26. The rear housing member 7 in accordance with the present embodiment is provided with a cylinder portion 7b extending in the opposite direction of the front housing member 2 in the axial direction from a center hole 7a thereof. The electromagnet 25 is supported by a ball bearing 27 provided in the cylinder portion 7b so as to be relatively rotatable with the rear housing member 7 (and the front housing member 2).

In the present embodiment, seal members 28a and 28b are interposed between an outer circumference of the rear housing member 7 and an inner circumference of the front housing member 2, and between an inner circumference of the rear housing member 7 and an outer circumference of the inner shaft 3. In other words, the interior of the front housing member 2 accommodating the main clutch 14 and the pilot clutch 15, particularly a space surrounded by the inner circumference of the front housing member 2, the outer circumference of the inner shaft 3 and the rear housing member 7 is structured in a liquid tight manner, and a lubricating fluid fills the space. The main clutch 14 and the pilot clutch 15 are structured as a wet type friction clutch mechanism in which each of the inner clutch plates 18 and 24 and each of the outer clutch plates 17 and 23 are frictionally engaged in a state in which the lubricating fluid is interposed.

An annularly formed armature 29 is engaged within the front housing member 2 via a spline at a position holding the outer clutch plate 23 and the inner clutch plate 24 between the armature 29 and the rear housing member 7 so as to be slidable in the axial direction. The pilot clutch 15 in accordance with the present embodiment is structured such that the armature 29 is attracted by the electromagnetic force of the electromagnet 25 so as to be moved in such a manner as to hold each of the outer clutch plate 23 and the inner clutch plate 24 between the armature 29 and the rear housing member 7, whereby the outer clutch plate 23 and the inner clutch plate 24 are frictionally engaged.

As mentioned above, in the power transmission device 1 in accordance with the present embodiment, it is possible to control the operation (the frictional engaging force) of the pilot clutch 15 through an electric power supply to the electromagnet 25. Further, the power transmission device 1 is formed so as to control the operation of the main clutch 14, that is, the drive force which can be transmitted between the front housing member 2 and the inner shaft 3, through operation of the pilot clutch 15.

(Coupling Structure of Flanged Coupling Member and Front Housing Member)

Next, a description will be given of a coupling structure between the flanged coupling member 4 and the front housing member 2 in the power transmission device 1 constructed as described above.

As shown in FIG. 1, the flanged coupling member 4 is provided with a shaft portion 31 to which drive force from a propeller shaft is input, and a flange portion 32 formed in one end of the shaft portion 31. The flanged coupling member 4 is coupled to the front housing member 2 on the basis of the fastening using a bolt, in a state in which the shaft portion 31 is coaxially arranged with the front housing member 2, and the flange portion 32 is brought into contact with an outer surface S in the axial direction of the bottom portion 2a of the front housing member 2.

In detail, a flanged coupling member 4 in accordance with the present embodiment is fastened to the front housing member 2 in the shaft portion 31. Specifically, an insertion hole 2c for inserting a fastening bolt 33 is formed in a center of the bottom portion 2a of the front housing member 2. A bolt hole 31a corresponding to the insertion hole 2c is formed in the shaft portion 31 of the flanged coupling member 4. Further, in the present embodiment, the bolt 33 is inserted into the insertion hole 2c from the inner side of the front housing member 2, and the bolt 33 is screwed with the bolt hole 31a, whereby the flanged coupling member 4 and the front housing member 2 are fastened in the axial direction.

In the present embodiment, a seal member 34 is interposed between the flange portion 32 of the flanged coupling member 4 and the bottom portion 2a of the front housing member 2, whereby a sealing performance within the front housing member 2 is secured. The ball bearing 9 supporting the inner shaft 3 is fixed to an inner circumference of an annular bearing holding portion 2d that extends from the bottom portion 2a of the front housing member 2 along the axial direction. A part (a bolt head 33a) of the bolt 33 protruding into the front housing member 2 is arranged within the hollow inner shaft 3 on the basis of screwing. A space 2e in an outer circumference of the bearing holding portion 2d is utilized as a space reserving the lubricating fluid filling the front housing member 2, or an oil reservoir.

A flange portion 32 in accordance with the present embodiment is provided with a tubular engagement portion 35 that extends along the axial direction from an outer peripheral edge thereof. The engagement portion 35 is arranged on an outer circumference of the front housing member 2 on the basis of the fastening mentioned above, and the front housing member 2 is engaged with an inner circumferential surface of the engagement portion 35. Splines 35a and 2g approximately extending along the axial direction are respectively formed on the inner circumference of the engagement portion 35 and the outer circumference of the front housing member 2 in accordance with the present embodiment. Further, it is possible to achieve an efficient torque transmission by engaging the splines 35a and 2g, that is, engaging the front housing member 2 and the engagement portion 35 via a spline on the basis of the fastening mentioned above. The outer diameter of a portion in which the spline 2g is formed in the front housing member 2 is smaller than the outer diameter of the other portions. In other words, a small-diameter portion 2f is formed at a position engaging with the engagement portion 35 in the front housing member 2. Further, at a time when the front housing member 2 and the engagement portion 35 are engaged, the outer diameter of the engagement portion 35 fitted to the small-diameter portion 2f becomes equal to the outer diameter of the other positions than the small-diameter portion 2f of the front housing member 2.

Figure 2:
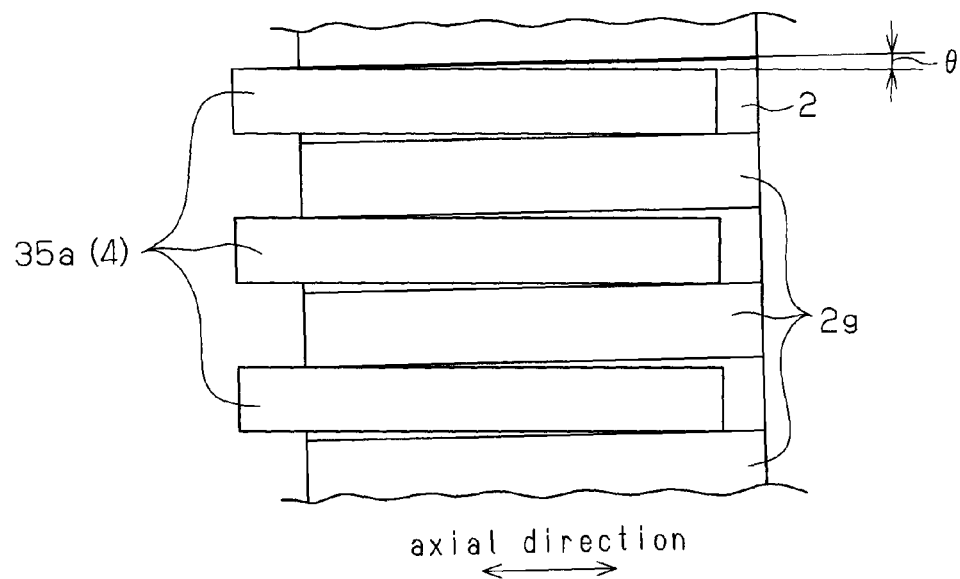
FIG. 2 is a view schematically showing the structure of an engagement portion.

Further, as shown in FIG. 2, a predetermined lead angle θ (an angle defined by the extending direction of each of the splines 35a of the engagement portion 35 with respect to the axial direction) is set for the spline 35a of the flanged coupling member 4 in accordance with the present embodiment, and each of the splines 2g of the front housing member 2 is fitted between the splines 35a of the engagement portion 35 on the basis of a pressure insertion. The lead angle θ in accordance with the present embodiment corresponds to an angle formed by a straight line extending along the axial direction of the front housing member 2, and a straight line extending along the extending direction of each of the splines 35a of the engagement portion 35. On the basis of this structure, it is possible to remove a gap between both splines 35a and 2g so as to prevent a rattling in the circumferential direction from being generated.

Next, a description will be given below of operation and effects of the embodiment described above.

(1) The flanged coupling member 4 is provided with the shaft portion 31 to which the drive force is input, and the flange portion 32 formed in one end of the shaft portion 31. The flanged coupling member 4 is coupled to the front housing member 2 with the bolt 33 in the state in which the shaft portion 31 is arranged coaxially with the front housing member 2, and the flange portion 32 is brought into contact with the outer surface S in the axial direction of the bottom portion 2a of the front housing member 2. The flange portion 32 is provided with the tubular engagement portion 35, which extends from the outer peripheral edge in the axial direction. The engagement portion 35 is arranged on the outer circumference of the front housing member 2 on the basis of the fastening mentioned above, and the engagement portion 35 and the front housing member 2 are engaged. The flanged coupling member 4 is fastened to the front housing member 2 in the shaft portion 31 thereof.

In accordance with the structure described above, since the bolt hole 31a for fastening is formed in the shaft portion 31 of the flanged coupling member 4, the space (or the thickness of the bottom portion) for forming the bolt hole 31a is not necessary in the bottom portion 2a of the front housing member 2, whereby it is possible to reduce of the length in the axial direction. In addition, since it is not necessary to form the insertion hole for the bolt 33 in the flange portion 32, it is possible to suppress reduction in strength of the flange portion 32 by forming the insertion hole. As a result, it is possible to make the thickness of the flange portion 32 thinner so as to further reduce the length in the axial direction and the weight. Further, it is possible to restrict the relative rotation between the flanged coupling member 4 and the front housing member 2 by engaging the engagement portion 35 and the front housing member 2, whereby it is possible to secure a high torque transmission efficiency. As a result, it is possible to achieve low cost, reduce weight and a reduction in the axial dimension. Further, the space for reserving the lubricating fluid, or an oil reservoir, can be provided in the space 2e near the bottom portion of the front housing member 2 which is formed by the fastening position of the bolt 33 being positioned in the shaft portion 31. Accordingly, it is possible to achieve further downsizing of the power transmission device 1 by effectively utilizing the space.

(2) The engagement portion 35 of the flanged coupling member 4 is extended in the axial direction from the peripheral edge of the flange portion 32 so as to be arranged on the outer circumference of the front housing member 2, and the front housing member 2 is engaged with the inner circumferential surface of the engagement portion 35. In accordance with this structure, since the outer circumference of the front housing member 2 and the engagement portion 35 are engaged, the torque transmission is executed at the position which is away from the axis in the radial direction. Accordingly, it is possible to make an area of the engagement portion 35 necessary for transmitting the torque smaller, and it is possible to achieve further downsizing.

(3) The flanged coupling member 4 is coupled to the front housing member 2 by the engagement portion 35 being engaged with the front housing member 2 via a spline. In accordance with this structure, since the engagement portion 35 and the front housing member 2 are spline fitted, it is possible to achieve a higher torque transmission efficiency.

(4) The predetermined lead angle θ is set in the spline 35a of the flanged coupling member 4. In accordance with this structure, it is possible to remove the gap between both splines 35a and 2g so as to prevent the rattling in the circumferential direction from being generated. As a result, it is possible to suppress a generation of a vibration at a time of rotating caused by the rattling in the circumferential direction mentioned above, and it is possible to prevent a slack of the bolt 33 caused thereby.

(5) A part (the bolt head 33a) of the bolt 33 screwed with the shaft portion 31 of the flanged coupling member 4 and protruding into the front housing member 2 is arranged in a hollow portion of the inner shaft 3. In accordance with this structure, the fastening position of the bolt 33 can be provided in the shaft portion 31 without preventing the reduction in the axial dimension of the power transmission device 1.

The present embodiment may be modified as follows.

In the present embodiment, the tubular engagement portion 35 is engaged with the front housing member 2 via a spline. However, the structure is not limited to this, but the following structure may be employed. In other words, an engagement portion is provided which extends in the axial direction from a peripheral edge of the flange portion 32 and is arranged on the outer circumference of the front housing member 2, and an engagement projection is provided in the engagement portion. A recess is provided in the outer circumference of the front housing member 2 opposing to the engagement portion. Further, the engagement projection and recess may be engaged with each other. Further, an engagement recess may be provided in the engagement portion, and the engagement recess may be engaged with a projection formed in the front housing member 2. The shape of the engagement portion may be formed in the same tubular shape as the engagement portion 35 in accordance with the embodiment mentioned above, or may be formed in a claw shape.

The engagement portion 35 of the flanged coupling member 4 in accordance with the present embodiment extends in the axial direction from the peripheral edge of the flange portion 32 and is arranged on the outer circumference of the front housing member 2. However, a recess and a projection engaging with each other may be provided in an opposing surface of the flange portion 32 to the front housing member 2, and an opposing surface (the outer surface S in the axial direction) of the bottom portion 2a of the front housing member 2 to the flange portion 32, whereby a relative rotation between the flanged coupling member 4 and the front housing member 2 is restricted.

In the present embodiment, the predetermined lead angle θ is set in the spline 35a of the flanged coupling member 4. However, the lead angle θ may be set in the spline 2g of the front housing member 2.

In the present embodiment, the present invention is applied to a structure in which the front housing member 2 and the inner shaft 3 are made of different materials. However, the present invention may be applied to a front housing member 2 and an inner shaft 3 that are formed by the same material.

In the present embodiment, the drive force generated in the engine corresponding to the drive source input to the flanged coupling member 4, and is output from the inner shaft 3. However, the transmission direction of the drive force may be set to an inverse direction of the present embodiment.

The invention claimed is:

1. A power transmission device comprising:
a tubular first rotator having a bottom portion, an outer surface of the tubular first rotator at a location other than said bottom portion having a predetermined first diameter, and an axial direction, the first rotator having a recess or a projection on an outer surface of the bottom portion of the first rotator, wherein the outer surface of the bottom portion has a predetermined second diameter, the predetermined second diameter of the outer surface of the bottom portion being smaller than said predetermined first diameter;
a shaft-shaped second rotator arranged rotatably within the first rotator, the second rotator being arranged coaxially with the first rotator;
a clutch mechanism arranged between the first rotator and the second rotator and provided with at least one clutch engaging portion where torque transmitting elements of the clutch engage one another for coupling the first rotator and the second rotator so as to transmit torque;
a flanged coupling member coupled to the first rotator so as to be prevented from rotating relative to the first rotator; and
a bolt axially coupling the flanged coupling member to the first rotator,
the flanged coupling member including:
a shaft portion having a diameter smaller than the predetermined second diameter of the first rotator,
a flange portion in contact with the outer surface of the bottom portion of the first rotor in the axial direction and extending radially outwardly from the shaft portion, and
an engagement portion extending in the axial direction from the flange portion in an opposite direction to the shaft portion, the engagement portion having a radially inner periphery engaged with the outer surface of the bottom portion of the first rotator, the engagement portion having an engagement projection or an engagement recess, wherein the engagement projection or engagement recess of said engagement portion is provided radially outside of said shaft portion of the flanged coupling member and radially outside of said at least one clutch engaging portion of said clutch mechanism,
wherein a head of the bolt is at least partly arranged at the same location as the engagement portion of the flanged coupling member in the axial direction, and
wherein the first rotator is fastened to the flanged coupling member with the bolt inserted into the first rotator coaxially with the shaft portion, and the engagement projection or the engagement recess of the engagement portion is engaged with the recess or the projection of the first rotator, whereby the flanged coupling member is coupled to the first rotator so as to be prevented from rotating relative to the first rotor.

2. The power transmission device according to claim 1, wherein the flange portion includes a peripheral edge, the engagement portion has an inner circumferential surface and extends in the axial direction from the peripheral edge of the flange portion and is arranged on the outer circumference of the first rotator, and the first rotator is engaged with the inner circumferential surface of the engagement portion.

3. The power transmission device according to claim 2, wherein each of the first rotator and the engagement portion is provided with a spline, and the flanged coupling member is coupled to the first rotator by the engagement portion engaging with the first rotator via the splines.

4. The power transmission device according to claim 3, wherein a predetermined lead angle is set in the spline of one of the engagement portion and the first rotator, whereby the lead angle of the spline of the engagement portion differs from the lead angle of the first rotator.

5. The power transmission device according to claim 4, wherein the lead angle is defined by a straight line extending along the axial direction of the first rotator, and a straight line extending along an extending direction of the spline of the engagement portion.

6. The power transmission device according to claim 1, wherein the second rotator is provided with a hollow portion, and the bolt is provided with a portion that protrudes into the first rotator at a time of fastening the first rotator and the flanged coupling member, and is arranged within the hollow portion of the second rotator.

7. The power transmission device according to claim 1, wherein the engagement portion has a radially outer periphery having a diameter that is not greater than said predetermined second diameter.

8. A power transmission device comprising:

a first torque transmission element having a tubular shape to accommodate therein a clutch mechanism provided with at least one clutch engaging portion where torque transmitting elements of the clutch engage one another for selectively transmitting rotational torque thereto, the first torque transmission element being mounted to rotate about the rotation axis of the tubular shape to transmit the rotational torque, wherein said tubular shaped first torque transmission element has an outer surface with a predetermined first diameter, a bottom portion extending transverse to the rotation axis at one axial end of the tubular shape and having an outer surface with a predetermined second diameter smaller than said predetermined first diameter, and another axial end of the tubular shape;

one of a recess and a projection formed at the outer surface of the bottom portion of the tubular shaped first torque transmission element;

a second torque transmission element connected to said first torque transmission element for rotating with said first torque transmission element to transmit the rotational torque, the second torque transmission element comprising:

a flange portion extending radially over said bottom portion of said first torque transmission element, a shaft portion having a diameter smaller than that of the first torque transmission element, extending coaxial with said rotation axis and extending from said flange portion in a direction away from said other end of the tubular shape, and an engagement portion provided at a radially outer portion of said flange portion and extending in the direction of the rotation axis over said outer surface of the bottom portion of the outer periphery of said first torque transmission element in a direction toward said other end, a radially inner periphery of said engagement portion being provided with another of the recess and the projection, the another of the recess and the projection being provided radially outside of said shaft portion of the second torque transmission element and radially outside of said at least one clutch engaging portion of said clutch mechanism, wherein the one of the recess and projection formed at the outer surface of the tubular shaped first torque transmission element and the another of the recess and the projection provided at the engagement portion engage each other to transmit the rotational torque between the first torque transmission element and the second torque transmission element; and a bolt extending through said bottom portion coaxially with said rotation axis, and inserted into said shaft portion to axially connect said first and second torque transmission elements, wherein a head of the bolt is at least partly arranged at the same location as the engagement portion in the direction of the rotation axis.

9. The power transmission device according to claim 8, wherein each of the first torque transmission element and the engagement portion is provided with a spline, and the flanged coupling member is coupled to the first torque transmission element by the engagement portion engaging with the first torque transmission element via the splines.

10. The power transmission device according to claim 8, wherein the engagement portion has a radially outer periphery having a diameter that is not greater than said predetermined second diameter.

* * * * *